United States Patent
Bagwell et al.

(10) Patent No.: US 11,485,335 B2
(45) Date of Patent: Nov. 1, 2022

(54) LAWN CARE VEHICLE BRAKE SYSTEM WITH IMPROVED BRAKE CABLE ACTUATION

(71) Applicant: HUSQVARNA AB, Huskvarna (SE)

(72) Inventors: Jake Bagwell, Huntersville, NC (US); Mark Wagner, Harrisburg, NC (US); Braxton Reese, Charlotte, NC (US)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 17/600,497

(22) PCT Filed: Oct. 30, 2019

(86) PCT No.: PCT/IB2019/059314
§ 371 (c)(1),
(2) Date: Sep. 30, 2021

(87) PCT Pub. No.: WO2021/024031
PCT Pub. Date: Feb. 11, 2021

(65) Prior Publication Data
US 2022/0097664 A1 Mar. 31, 2022

Related U.S. Application Data

(60) Provisional application No. 62/882,203, filed on Aug. 2, 2019.

(51) Int. Cl.
*B60T 11/04* (2006.01)
*A01D 34/82* (2006.01)
(Continued)

(52) U.S. Cl.
CPC ............ *B60T 11/046* (2013.01); *A01D 34/82* (2013.01); *A01D 34/824* (2013.01); *B60T 7/102* (2013.01);
(Continued)

(58) Field of Classification Search
CPC ................... A01D 34/64; A01D 69/10
(Continued)

(56) References Cited

U.S. PATENT DOCUMENTS

| 3,861,237 A | 1/1975 | Mounts | |
| 8,240,420 B1* | 8/2012 | Bartel | B62D 11/006 |
| | | | 180/315 |

(Continued)

FOREIGN PATENT DOCUMENTS

| WO | 2015169381 A1 | 11/2015 |
| WO | 2018211436 A1 | 11/2018 |

OTHER PUBLICATIONS

International Search Report and Written Opinion from related international application No. PCT/IB2019/059314 dated May 11, 2020, all pages cited in its entirety.

(Continued)

*Primary Examiner* — Christopher P Schwartz
(74) *Attorney, Agent, or Firm* — Burr & Forman LLP (57) ABSTRACT

A riding lawn care vehicle (10) includes first and second drive wheels (32), a steering lever (34), a brake assembly (110), and a mechanical brake linkage assembly (120) including a cable tensioner (250). The brake assembly (110) may be operably coupled to at least one of the first and second drive wheels (32) to enable brakes to be selectively applied to the first and second drive wheels (32) based on a position of the steering lever (34). The cable tensioner (250) may be configured to activate the brake assembly (110) relative to the at least one of the first and second drive wheels (32) in response to the steering lever (34) being moved outwardly to an outboard position. The mechanical linkage assembly (120) may be configured to provide a greater amount of rotation of the cable tensioner (250) than a magnitude of rotation of the steering lever (34) when the (Continued)

steering lever (34) is moved from the inboard position to the outboard position.

19 Claims, 6 Drawing Sheets

(51) Int. Cl.
| | |
|---|---|
| *B60T 7/10* | (2006.01) |
| *B62D 11/00* | (2006.01) |
| *F16D 65/28* | (2006.01) |
| *A01D 34/64* | (2006.01) |
| *A01D 101/00* | (2006.01) |
| *B62D 11/02* | (2006.01) |
| *F16D 121/14* | (2012.01) |
| *F16D 125/62* | (2012.01) |
| *F16D 125/64* | (2012.01) |

(52) U.S. Cl.
CPC .......... *B62D 11/006* (2013.01); *F16D 65/28* (2013.01); *A01D 34/64* (2013.01); *A01D 2101/00* (2013.01); *B62D 11/02* (2013.01); *F16D 2121/14* (2013.01); *F16D 2125/62* (2013.01); *F16D 2125/64* (2013.01)

(58) Field of Classification Search
USPC ............... 56/11.3–11.9; 188/2 D; 192/224.1, 192/224.2
See application file for complete search history.

(56) References Cited

U.S. PATENT DOCUMENTS

| | | | |
|---|---|---|---|
| 10,681,867 B2* | 6/2020 | Dunbar | ................. A01D 69/10 |
| 10,834,870 B2* | 11/2020 | Wagner | ................. A01D 34/64 |
| 2017/0113721 A1 | 4/2017 | Slegelis et al. | |
| 2019/0274251 A1 | 9/2019 | Dunbar et al. | |
| 2020/0000039 A1* | 1/2020 | Reese | .................... A01D 69/10 |

OTHER PUBLICATIONS

International Search Report and Written Opinion for International Application No. PCT/IB2019/059314 dated May 11, 2020.

\* cited by examiner

LAWN CARE VEHICLE BRAKE SYSTEM WITH IMPROVED BRAKE CABLE ACTUATION

CROSS REFERENCE TO RELATED APPLICATION

This application claims priority to U.S. application No. 62/882,203 filed Aug. 2, 2019, the entire contents of which are hereby incorporated by reference in its entirety.

TECHNICAL FIELD

Example embodiments generally relate to lawn care vehicles and, more particularly, to brake systems (e.g., parking brake systems) for riding lawn care vehicles.

BACKGROUND

Lawn care tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines, and are relatively inexpensive. Meanwhile, at the other end of the spectrum, riding lawn mowers, such as lawn tractors, can be quite large. Riding lawn mowers can sometimes also be configured with various functional accessories (e.g., trailers, tillers, and/or the like) in addition to grass cutting components. Riding lawn mowers provide the convenience of a riding vehicle as well as a typically larger cutting deck as compared to a walk-behind model.

By their very nature, riding lawn mowers include steering assemblies that are used to direct the movement of the riding lawn mowers. The steering assemblies often take the familiar form of a steering wheel. However, handlebar assemblies have also been used in some cases. More recently, some mowers have been provided with very short (e.g., near zero) turning radiuses. Such mowers have employed separate steering levers that interface with the drive wheels on each respective side of the mower.

A feature of some of the models that have a short turning radius and steering levers is that the steering levers move forward and rearward to control the drive wheels while the steering levers are in a normal (inboard) position. Meanwhile, the steering levers can be pivoted outwardly to an outboard position in order to apply a parking brake and enable the operator to depart from the vehicle. The pivoting action to the outboard position is often converted into a braking function by coupling the movement of the top part of the steering lever to the brake assembly via a cable. However, the sizes and tolerances of the components involved in the pivoting action generally limit the amount of "throw" that is achievable. Moreover, additional components (e.g., springs or other biasing members) may be required in order to keep the top part of the steering lever stable in each position (i.e., inboard or outboard). Thus, it may be desirable to provide an improved pivoting structure or other brake system components, which may give superior performance with a simpler and cheaper structural architecture.

BRIEF SUMMARY OF SOME EXAMPLES

Some example embodiments of the present invention provide steering levers on a riding lawn care vehicle that are movable to an outboard position to activate a brake assembly. However, example embodiments effectively provide a structure for angular input amplification so that a small input angle due to rotation of the steering levers is translated into a larger angular output. Moreover, example embodiments can keep the steering levers in the outboard position without adding a dedicated spring for such purpose. Various other advantages can be achieved based on this angular amplification, as described in greater detail herein.

In one example embodiment, a riding lawn care vehicle is provided. The riding lawn care vehicle may include a frame to which at least a first drive wheel and a second drive wheel of the riding lawn care vehicle are attachable, a steering assembly, a brake assembly and a mechanical brake linkage assembly. The steering assembly may include a steering lever. The steering lever may be one of a pair of steering levers. Each of the steering levers may be operably coupled to the first and second drive wheels respectively to facilitate turning of the riding lawn care vehicle based on drive speed control of the first and second drive wheels responsive to positioning of the steering levers. The brake assembly may be operably coupled to the first and second drive wheels to enable brakes to be selectively applied to the first and second drive wheels. The mechanical brake linkage assembly may be operably coupled between the steering lever and the brake assembly via a cable assembly. The steering lever may be operably coupled to provide drive speed control inputs to a corresponding one of the first or second drive wheels via a carrier configured to pivot in a forward or rearward direction when the steering lever is in an inboard position. The steering lever may be operably coupled to an arm that is operably coupled to the carrier to pivot the steering lever in a direction substantially perpendicular to the forward or the rearward direction when the steering lever is moved to an outboard position. The mechanical brake linkage assembly may include a cable tensioner configured to activate the brake assembly relative to the corresponding one of the first or second drive wheels in response to the steering lever being moved outwardly to the outboard position. The mechanical linkage assembly may be configured to provide a greater amount of rotation of the cable tensioner than a magnitude of rotation of the steering lever when the steering lever is moved from the inboard position to the outboard position.

In another example embodiment, a mechanical brake linkage assembly of a riding lawn care vehicle is provided. The riding lawn care vehicle may include first and second drive wheels, a steering lever, and a brake assembly. The brake assembly may be operably coupled to at least one of the first and second drive wheels to enable brakes to be selectively applied to the first and second drive wheels based on a position of the steering lever. The mechanical brake linkage assembly may include a cable tensioner that may be configured to activate the brake assembly relative to the at least one of the first and second drive wheels in response to the steering lever being moved outwardly to an outboard position. The mechanical linkage assembly may be configured to provide a greater amount of rotation of the cable tensioner than a magnitude of rotation of the steering lever when the steering lever is moved from the inboard position to the outboard position.

Some example embodiments may improve an operator's ability to apply the brakes of a lawn care vehicle for starting, dismounting, and/or transporting the vehicle. The user experience associated with operating and transporting the riding lawn care vehicle may therefore be improved.

BRIEF DESCRIPTION OF THE SEVERAL VIEWS OF THE DRAWING(S)

Having thus described some embodiments of the present invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability, or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, the phrase "operable coupling" and variants thereof should be understood to relate to direct or indirect connection that, in either case, enables functional interconnection of components that are operably coupled to each other.

Some example embodiments may improve the ability of an operator to apply, engage, actuate, and/or otherwise activate brakes of lawn care vehicles such as, for example, riding lawn mowers. In this regard, some example embodiments may provide a steering assembly and mechanical brake linkage for use on a lawn care vehicle to apply brakes to the drive wheels by moving a steering lever outboard using a more efficient and effective structural assembly. The brakes may therefore be easily applied to facilitate dismounting, transporting, and/or starting of the vehicle while applying, for example, the parking brake. Example embodiments may provide a physical link between the steering levers and the parking brake, but furthermore may provide such physical link in a manner that allows a small input angle to drive a larger output angle. Movement of the levers may therefore create a locking sensation for the positioning of the levers in each of the inboard and outboard positions, but can do so without using an additional and dedicated spring. Thus, a simpler, cheaper, and yet still very effective design may be provided.

Figure 1A:
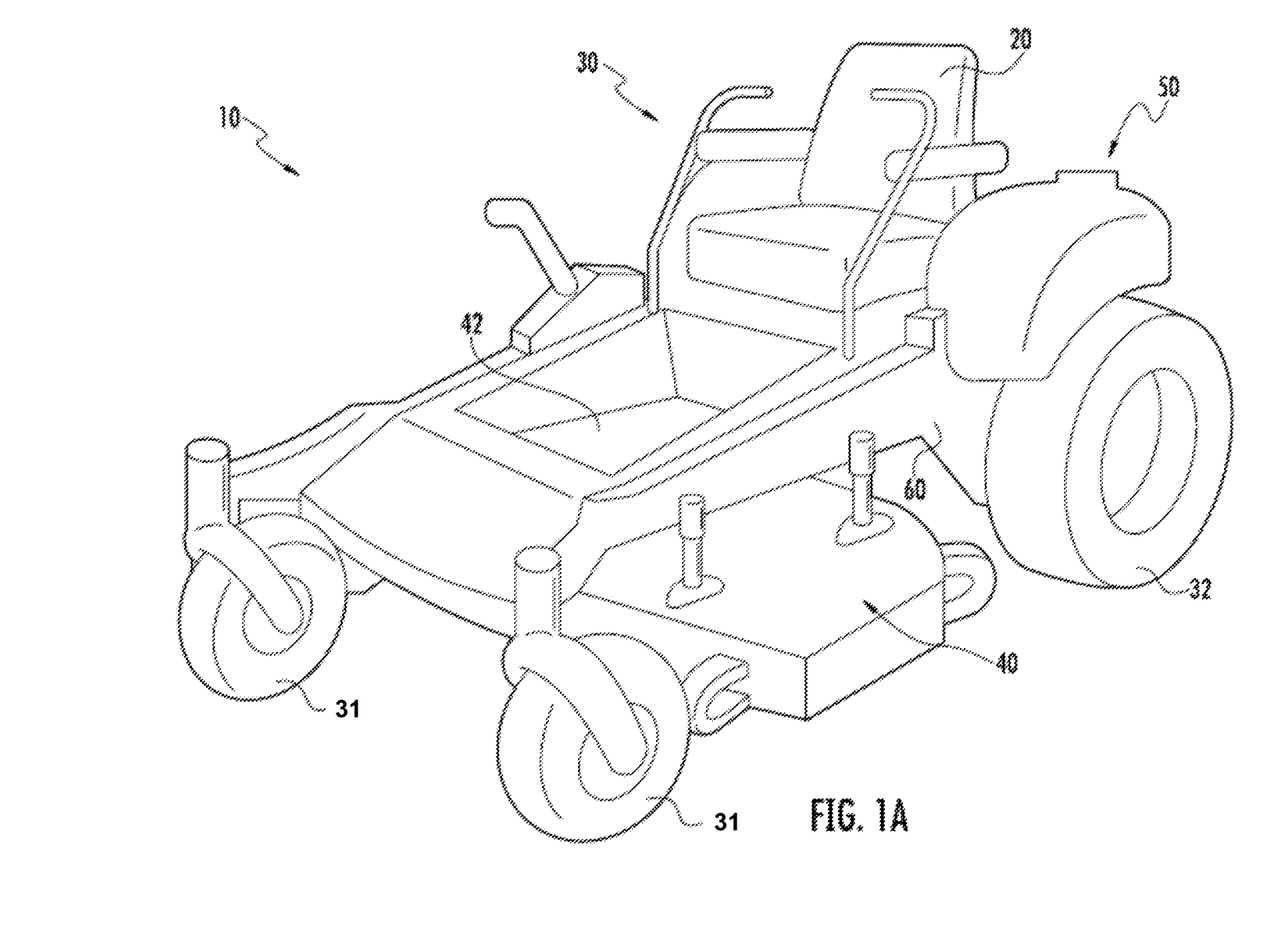
FIG. 1A illustrates a perspective view of a riding lawn care vehicle according to an example embodiment.
Figure 1B:
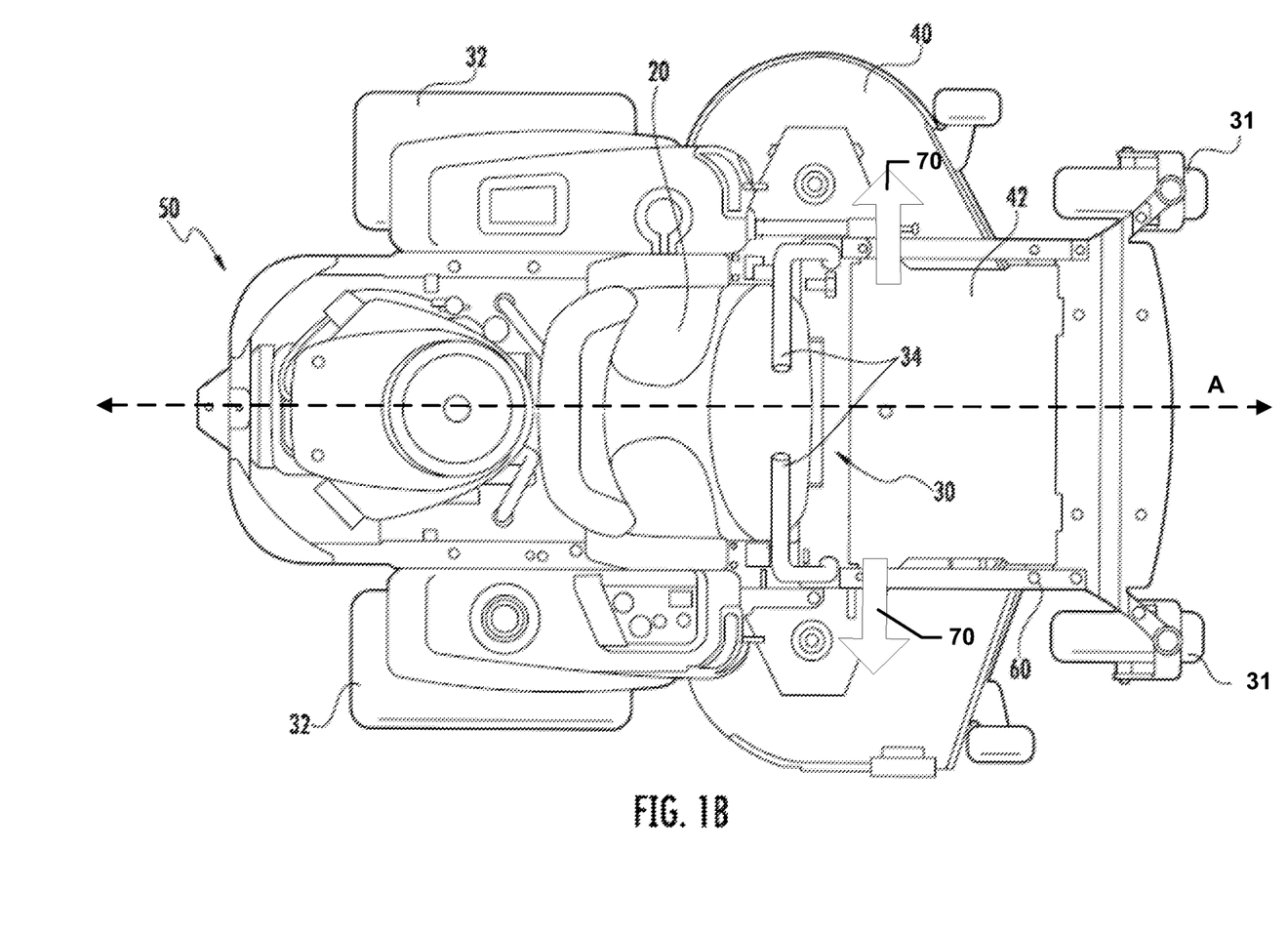
FIG. 1B illustrates a top view of the riding lawn care vehicle according to an example embodiment.

FIG. 1, which includes FIGS. 1A and 1B, illustrates a riding lawn care vehicle 10 according to an example embodiment. FIG. 1A illustrates a perspective view of the riding lawn care vehicle 10, and FIG. 1B illustrates a top view of the riding lawn care vehicle 10 according to an example embodiment. In some embodiments, the riding lawn care vehicle 10 may include a seat 20 that may be disposed at a center, rear, or front portion of the riding lawn care vehicle 10. The riding lawn care vehicle 10 may also include a steering assembly 30 (e.g., a set of steering levers or the like) functionally connected to wheels 31 and/or 32 of the riding lawn care vehicle 10 to allow the operator to steer the riding lawn care vehicle 10. The operator may sit on the seat 20, which may be disposed to the rear of the steering assembly 30 to provide input for steering of the riding lawn care vehicle 10 via the steering assembly 30. However, some models may be stand-up models that eliminate the seat 20. If the seat 20 is eliminated, the operator may stand at an operator station proximate to the steering assembly 30.

In an example embodiment, the steering assembly 30 may include separately operable steering levers 34. The riding lawn care vehicle 10 may also include a cutting deck 40 having at least one cutting blade (e.g., three cutting blades) mounted therein. The cutting deck 40 may be positioned substantially rearward of a pair of front wheels 31 and substantially forward of a pair of rear wheels 32 in a position to enable the operator to cut grass using the cutting blade(s) when the cutting blade(s) are rotated below the cutting deck 40 when the cutting deck 40 is in a cutting position. However, in some alternative examples, the cutting deck 40 may be positioned in front of the front wheels 31. In some embodiments, a footrest 42 may also be positioned above the cutting deck 40 forward of the seat 20 to enable the operator to rest his or her feet thereon while seated in the seat 20. In embodiments that do not include the seat 20, the footrest 42 may form the operator station from which a standing operator controls the riding lawn care vehicle 10. When operating to cut grass, the grass clippings may be captured by a collection system, mulched, or expelled from the cutting deck 40 via either a side discharge or a rear discharge.

In the pictured example embodiment, an engine 50 of the riding lawn care vehicle 10 is disposed to the rear of a seated operator. However, in other example embodiments, the engine 50 could be in different positions such as in front of or below the operator. As shown in FIG. 1, the engine 50 may be operably coupled to one or more of the wheels 31 and/or 32 to provide drive power for the riding lawn care vehicle 10. The engine 50, the steering assembly 30, the cutting deck 40, the seat 20, and other components of the riding lawn care vehicle 10 may be operably connected (directly or indirectly) to a frame 60 of the riding lawn care vehicle 10. The frame 60 may be a rigid structure configured to provide support, connectivity, and/or interoperability functions for various ones of the components of the riding lawn care vehicle 10.

In some example embodiments, the steering assembly 30 may be embodied as an assembly of metallic and/or other rigid components that may be welded, bolted, and/or otherwise attached to each other and operably coupled to the wheels of the riding lawn care vehicle 10 to which steering inputs are provided (e.g., rear wheels 32). For example, the steering assembly 30 may include or otherwise be coupled with hydraulic motors that independently power one or more drive wheels (e.g., rear wheels 32) on each respective side of the riding lawn care vehicle 10. When a steering lever 34 is pushed forward (e.g., away from the operator), the corresponding hydraulic motor may drive the corresponding wheel forward. When a steering lever 34 is pulled rearward (e.g., toward the operator as shown by the directional arrows in FIG. 2), the corresponding hydraulic motor may drive the corresponding wheel backward. Thus, when both steering levers 34 are pushed forward the same amount, the riding lawn care vehicle 10 travels forward in substantially a straight line because approximately the same amount of forward drive input is provided to each drive wheel. When both steering levers 34 are pulled back the same amount, the riding lawn care vehicle 10 travels backward (e.g., rearward) in substantially a straight line because approximately the same amount of rearward drive input is provided to each drive wheel. When one steering lever 34 is pushed forward and the other steering lever 34 is pulled back, the riding lawn care vehicle 10 begins to turn in a circle and/or spin. Steering right and left may be accomplished by providing uneven amounts of input to the steering levers 34. Other steering control systems may be employed in some alternative embodiments.

Figure 2:
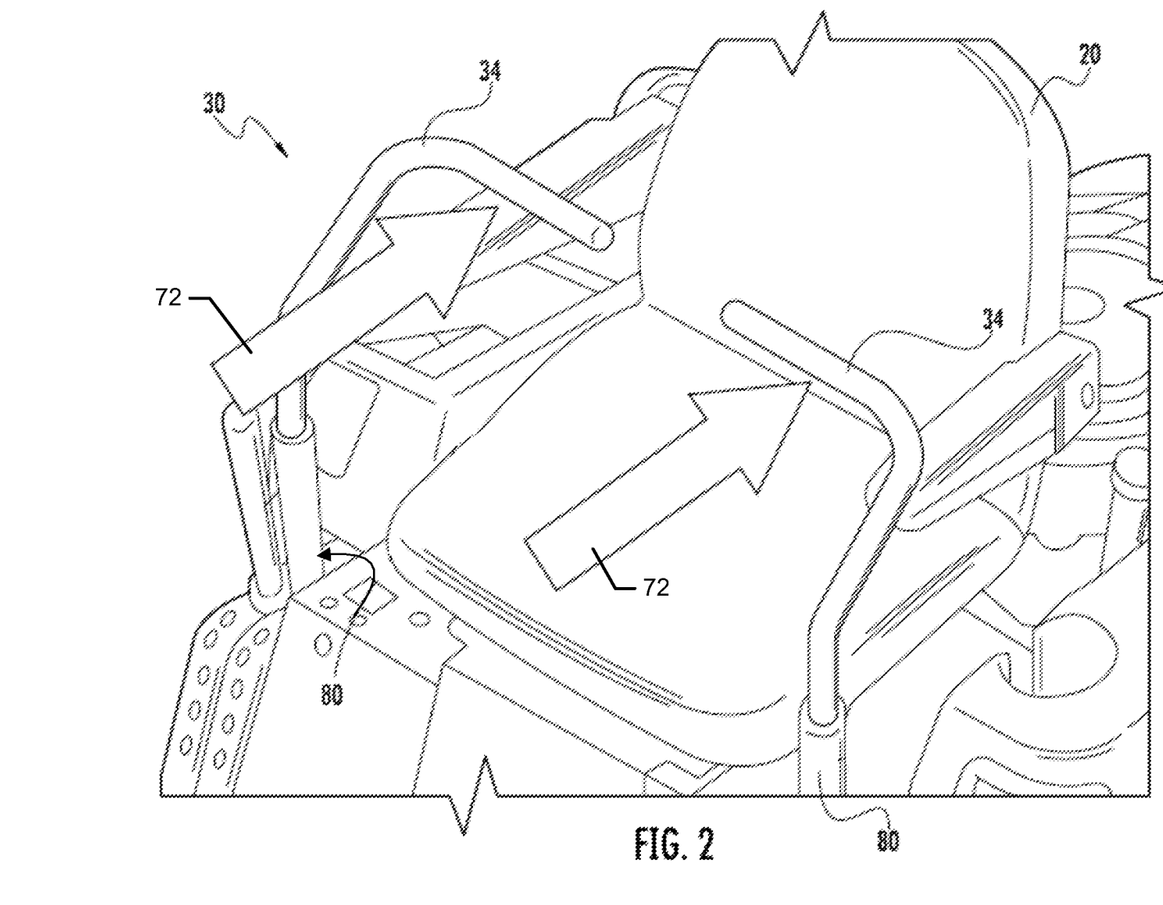
FIG. 2 illustrates a perspective view of a steering assembly with steering levers positioned to be pulled back for rearward propulsion according to an example embodiment.

Although the steering levers 34 are generally moved forward (i.e., opposite the direction of the arrows 72 shown in FIG. 2) or backward (i.e., in the direction of the arrows 72 shown in FIG. 2) in any desirable combination while they are in the operating positions shown in FIGS. 1 and 2, it should be appreciated that the steering levers 34 may also be moved to an outboard position (e.g., in a non-operational state) by moving the steering levers 34 outwardly in the direction shown by arrows 70 in FIG. 1B. In this regard, each of the steering levers 34 may be operably coupled to respective lever mounts 80 that may pivot to enable the steering levers 34 to move outwardly (e.g., to the outboard position) or inwardly (e.g., to an inboard and/or operating position). In some embodiments, when at least one of the steering levers 34 is pivoted outwardly, the operator may easily mount or dismount the riding lawn care vehicle 10 and sit in or leave the seat 20.

In many conventional riding lawn care vehicles, a brake lever separate and distinct from the steering assembly is provided to interface with the brake assembly of the vehicle. In contrast, example embodiments of the present invention may provide for the setting of the brake assembly via one or more of the steering levers 34 of the steering assembly 30. For example, in some embodiments, the moving of only one of the steering levers 34 to the outboard position causes the brakes for all of the drive wheels (e.g., the rear wheels 32) to activate. Thus, rather than having to operate a separate brake lever to activate the brakes, or rather than having to activate separate brakes for each of the drive wheels, example embodiments may activate the entire brake assembly (e.g., the brakes for both drive wheels) when either of the steering levers 34 is moved outboard, independent of the position of the other one of the steering levers 34.

Figure 3:
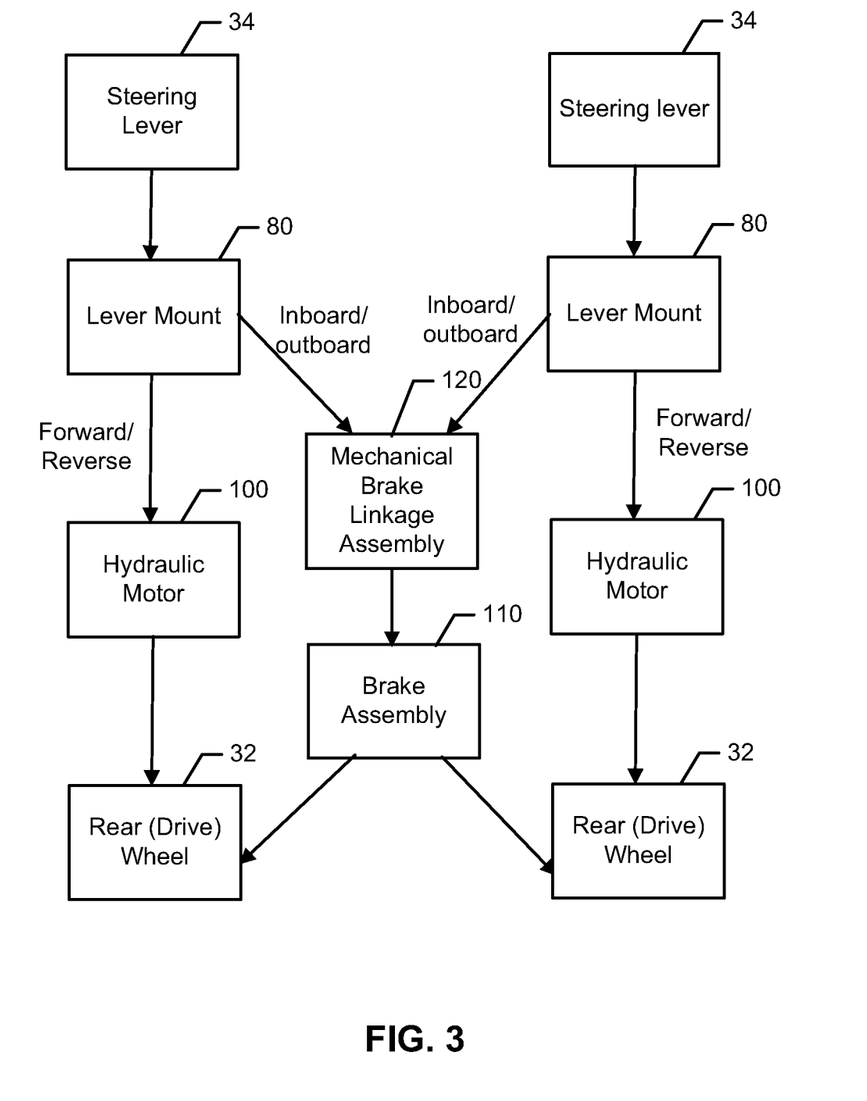
FIG. 3 illustrates a block diagram of some steering and braking components according to an example embodiment.

FIG. 3 illustrates a block diagram of some steering and braking components of an example embodiment. As shown in FIG. 3, each one of the steering levers 34 may be operably coupled to a corresponding one of the lever mounts 80. The lever mounts 80 may be operably coupled to corresponding hydraulic motors 100 that power respective ones of the drive wheels (e.g., the rear wheels 32). A brake system including a brake assembly 110 is also provided. However, as mentioned above, unlike a traditional system in which the brake assembly 110 is activated via a separate brake lever, the brake assembly 110 of an example embodiment activates brakes on both rear wheels 32 based on moving a position of the lever mount 80 and corresponding steering lever 34 of just one side (independent of the other) to the outboard position. Thus, while moving the lever mount 80 and corresponding steering lever 34 of either side in forward and reverse directions correspondingly operates the hydraulic motor 100 and drive wheel of the respective side, the movement of either lever mount 80 and corresponding steering lever 34 to the outboard position (e.g., moving the steering lever 34 outwardly and/or laterally away from the longitudinal centerline A of the riding lawn care vehicle 10) will engage and/or otherwise activate the brake assembly 110.

As shown in FIG. 3, a mechanical brake linkage assembly 120 is provided to operably couple both lever mounts 80 to the brake assembly 110. In various different embodiments, the inboard/outboard movements of the steering levers 34 (via the lever mounts 80) may either individually or collectively be accomplished to apply brakes to one or both of the rear wheels 32. For example, in some cases, if one lever mount 80 is pivoted to the outboard position, the mechanical brake linkage assembly 120 operates to activate the brake assembly 110 so that brakes are applied to a corresponding one of the rear wheels 32. Alternatively, movement of both lever mounts 80 may be required to apply brakes to one or both wheels. As yet another alternative, the inboard/outboard movement of just one of the steering levers 34 (via the lever mounts 80) may be accomplished to apply brakes at each of the rear wheels 32. In some embodiments, the brake assembly 110 may include a gear capable of locking the transaxle of each respective rear wheel 32, and a corresponding ratchet pawl may be engaged with the gear by the mechanical brake linkage assembly 120. If either one of the lever mounts 80 is moved to the outboard position, even if the other one of the lever mounts 80 remains in the inboard position, both rear wheels 32 will be locked via operation of the mechanical brake linkage assembly 120 to activate the brake assembly 110 by causing both gears to be engaged with their respective ratchet pawls.

Figure 4:
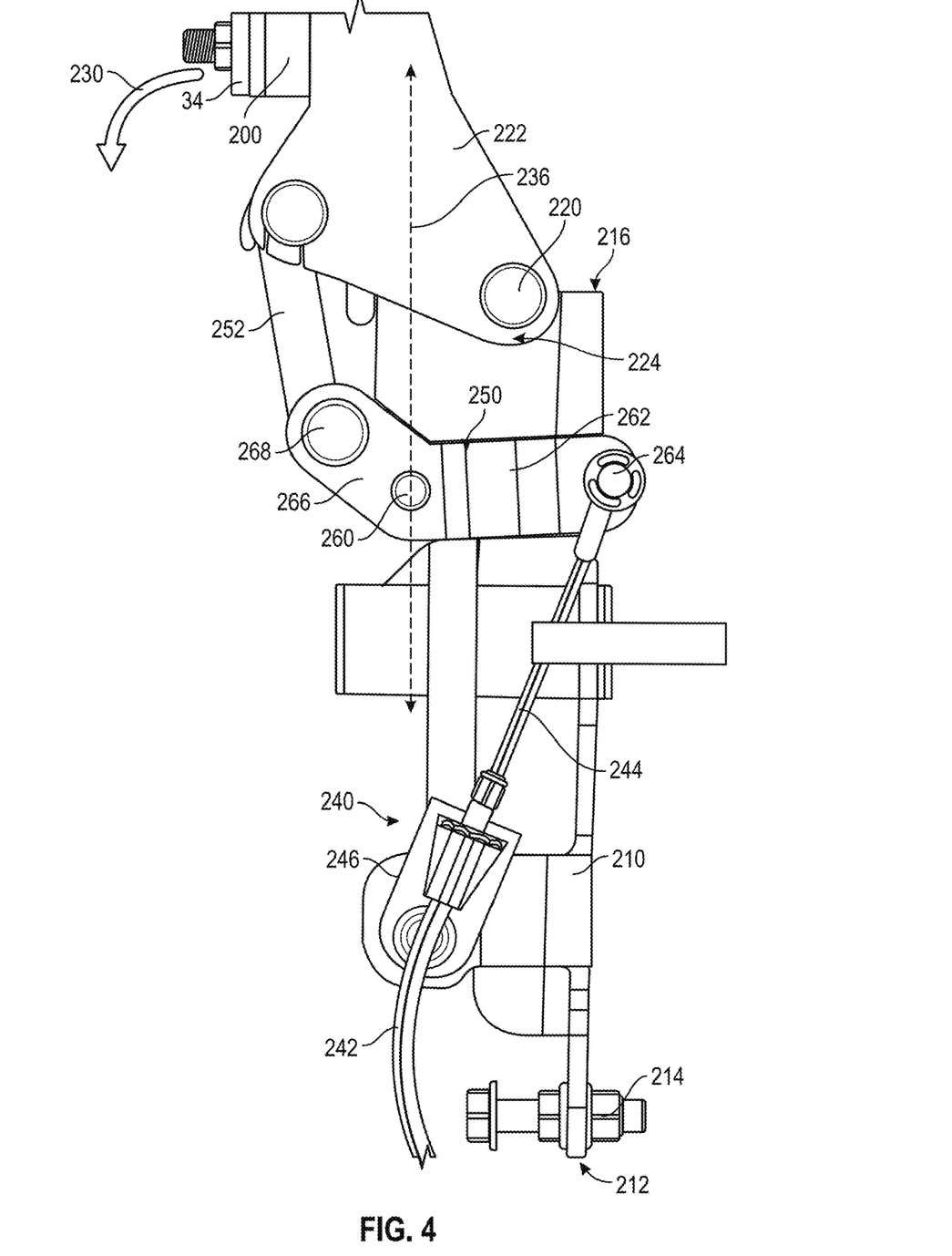
FIG. 4 illustrates an isolation view from the side to show some isolated components of a steering assembly along with a mechanical brake linkage assembly showing the interaction therebetween in accordance with an example embodiment.
Figure 5:
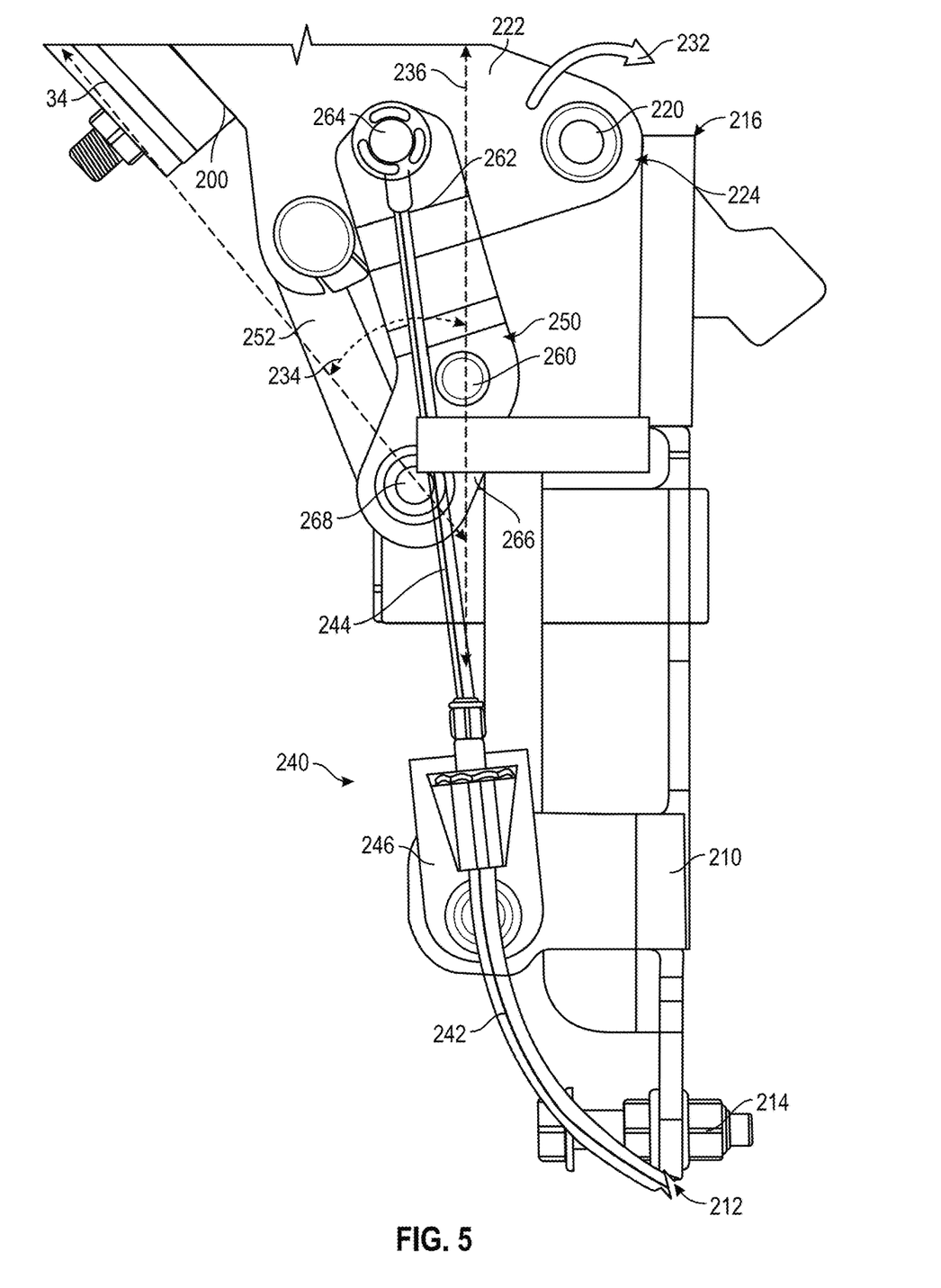
FIG. 5 shows the same isolation view of FIG. 4 after one steering lever is pivoted to an outboard position in accordance with an example embodiment.

FIGS. 4 and 5 illustrate more detailed views of some portions of the mechanical brake linkage assembly 120 to illustrate an example embodiment. In this regard, FIG. 4 illustrates a side view of some isolated components of the steering assembly 30 along with the mechanical brake linkage assembly 120 to show the interaction therebetween in accordance with an example embodiment. More particularly, FIG. 4 shows the mechanical brake linkage assembly 120 in an off position (i.e., brake "off") that corresponds to a respective one of the steering levers 34 being pivoted inboard. FIG. 5 shows the mechanical brake linkage assembly 120 in an on position (i.e., brake "on") that corresponds to the steering lever 34 being pivoted in the direction of arrow 70 in FIG. 1B to the outboard position. Of note, FIGS. 4 and 5 illustrate only one steering lever 34, but it should be appreciated that the other steering lever 34 is structured similarly and functions the same way when moved from the inboard (e.g., operational) position to the outboard (non-operational or brake "on" position).

The steering lever 34 of FIGS. 4 and 5 is attached to an arm 200 that is operably coupled to a carrier 210. The carrier 210 may be operably coupled at a proximal end 212 thereof to a portion of the frame 60 to enable the carrier 210 for pivot about a pivot point 214 forward (opposite arrow 72 in FIG. 2) and rearward (in the direction of arrow 72 in FIG. 2). The carrier 210 may also be operably coupled to the hydraulic motor 100 so that movement in the forward and rearward directions (i.e., into and out of the page) causes forward and rearward driving of the rear wheels 32 as described above. However, that operable coupling is outside the scope of this disclosure. Meanwhile, the arm 200 attaches to the carrier 210 at a distal end 216 of the carrier 210.

In particular, the arm 200 may have a pivotal coupling 220 to the distal end 216 of the carrier 210. In this regard, the arm 200 may include a pivot plate 222 that lies in a plane substantially perpendicular to a plane through which the carrier 210 pivots responsive to forward and rearward movement of the steering levers 34. In some cases, another pivot plate may mirror the pivot plate 222 on the rear side of the carrier 210 such that the arm 200 includes two pivot plates that extend on opposing sides of the carrier 210. The pivot plate 222 may have a distal end 224 (relative to the proximal end thereof, which is operably coupled to the steering lever 34), and the pivotal coupling 220 may be formed at the distal end 224 of the pivot plate 222 to join the distal end 224 of the pivot plate 222 to the distal end 216 of the carrier 210. When the steering lever 34 is in the inboard position, the carrier 210 may extend upwardly, and the steering lever 34 (at least the portion thereof that attaches to the arm 200) may extend upwardly substantially parallel to the direction of extension of the carrier 210. However, when the steering lever 34 is moved to the outboard position, the direction of extension of the steering lever 34 (at least the portion thereof that attaches to the arm 200) may no longer be substantially parallel to the direction of extension of the carrier 210.

Arrow 230 in FIG. 4 illustrates the direction the arm 200 pivots relative to the carrier 210 when the steering lever 34 is pushed to the outboard position. Meanwhile, arrow 232 in FIG. 5 illustrates the direction the arm 200 pivots relative to the carrier when the steering lever 34 is moved to the inboard position. The amount of angular movement formed by the movement of steering lever 34 to the outboard position is shown by angle 234 in FIG. 5. The vertical axis 236 from which the angle 234 is measured may also be considered to be top dead center or a center position that is a reference position for measuring amplification of the angle 234 as described in greater detail below.

As can be appreciated from FIGS. 4 and 5, the pivoting of the mechanical brake linkage assembly 120 may ultimately be operable (i.e., apply a brake to at least one of the rear wheels 32) by operation of a cable assembly 240. In this regard, the cable assembly 240 may be operably coupled to the brake assembly 110 to apply a braking force from the brake assembly 110 to either or both of the rear wheels 32. The cable assembly 240 includes a sheath 242 inside which cable 244 passes from one end of the cable assembly 240 to the other. The cable assembly 240 may generally be constructed so that the cable 240 is under tension and tends to (is biased to) be withdrawn into the sheath 242 and toward the brake assembly 110.

The cable assembly 240 may also include an anchor assembly 246 that pivotally couples the cable assembly 240 to a fixed point on the carrier 210. In this regard, for example, the anchor assembly 246 may have a fixed connection to the sheath 242, but a pivotal connection to the carrier 210. The cable 244 may therefore be enabled to move within the sheath 242 and rotate the anchor assembly 240 as the tension applied to the cable 244 is changed responsive to pivoting the steering lever 34 to the outboard position as described in greater detail below.

In an example embodiment, the mechanical brake linkage assembly 120 may further include a cable tensioner 250 and a link member 252 that operably couple the cable 244 to the arm 200 so that pivoting of the arm 200 to the outboard position applies additional tension to the cable 244 to apply brake forces to the rear wheels 32 via the brake assembly 110. In this regard, the link member 252 may extend between the arm 200 and the cable tensioner 250. More particularly, the link member 252 may be pivotally coupled to a portion of the pivot plate 222 that is offset from and spaced apart from the pivotal coupling 220 and the distal end 224 of the pivot plate 222 on a first end of the link member 252 and may be pivotally coupled to a portion of the cable tensioner 250 at a second end of the link member 252. The link member 252 may be an elongated piece of rigid material that imparts a force on the cable tensioner 250 to rotate the cable tensioner 250 when the steering lever 34 is rotated to the outboard position thereby moving the arm 200 in the direction of arrow 230, and exert a force to rotate the cable tensioner 250 in an opposing direction (i.e., in the direction of arrow 232) when the steering lever 34 is rotated to the inboard position.

In an example embodiment, the cable tensioner 250 may be embodied as a bellcrank having a pivot point 260 at which point the cable tensioner 250 is rotatably mounted to a portion of the carrier 210. The cable tensioner 250 may further include a first arm 262 that extends from the pivot point 260 to a cable attachment point 264 at a distal end of the first arm 262. The cable tensioner 250 may also include a second arm 266 that extends from the pivot point 260 to a link attachment point 268 at a distal end of the second arm 266. The cable tensioner 250 may be operably coupled to the cable 244 at the cable attachment point 264 and operably coupled to the link member 252 at the link attachment point 268.

In an example embodiment, the cable tensioner 250 may be formed as a bellcrank that (e.g., from sheet metal, steel or some other rigid material) has the first and second arms 262 and 266 formed with an angle between them that is larger than 90 degrees. Moreover, a length of the first arm 262 may be longer than a length of the second arm 266. The angle formed between the first and second arms 262 and 266 may be between about 110 degrees and about 150 degrees, and the second arm 266 may be between about 0.33 and 0.66 times as long as the first arm 262. Making the second arm 266 shorter than the first arm 262, and angling the first and second arms 262 and 266 relative to each other in the manner provided creates a mechanical advantage in terms of amplifying the rotation achievable by the cable tensioner 250 relative to the amount of rotation of the steering lever 34. For example, although the steering lever 34 may rotate substantially less than 90 degrees (e.g., from 20 degrees to 60 degrees), the cable tensioner 250 may rotate more than 90 degrees (e.g., from 90 degrees to 150 degrees). This causes a much longer amount of travel distance for the cable 244 to be achieved in a much smaller space (and with smaller parts used to achieve the travel distance).

As noted above, the cable system 240 may be arranged to keep the cable 244 under tension. Moreover, the cable 244 may be under tension when the steering lever 34 is in either the inboard position or the outboard position. As such, given that the cable attachment point 264 can be seen to pass over center (e.g., through a breakover point) when moving from the position shown in FIG. 4 to the position shown in FIG. 5, it should be appreciated that the tension on the cable 244 causes the cable tensioner 250 to be held (by the biasing of the cable 244) in the respective rest positions shown in FIGS. 4 and 5 for the brake "off" and brake "on" positions, respectively. As such, movement out of each of these rest positions may generally be resisted so that the inboard and outboard positions are each experienced as natural rest positions to which the steering levers 34 seem to be biased by the operator. Once over center moving in either direction, the cable system 240 will bias the cable tensioner 250 (and therefore the steering lever 34 itself) to a corresponding rest position in the inboard and outboard positions. The brake system 110 will therefore feel "locked" when the handles are moved to the outboard position since the cable system 240 provides a degree of tension that must be overcome to move the steering lever 34 back to the inboard position.

Accordingly, some example embodiments may enable movement of the steering levers to control the application of a parking brake or other brake assembly of the drive wheels of a mower such as a zero turn mower in a manner that enables the steering levers to feel locked in the outboard and inboard positions, but also using a structure that allows for greater cable displacement with a limited permissible input angle. Example embodiments effectively provide angular displacement amplification with a relatively compact yet robust design.

In an example embodiment, a riding lawn care vehicle may therefore be provided. The riding lawn care vehicle may include a frame to which at least a first drive wheel and a second drive wheel of the riding lawn care vehicle are attachable, a steering assembly, a brake assembly and a mechanical brake linkage assembly. The steering assembly may include a steering lever. The steering lever may be one of a pair of steering levers. Each of the steering levers may be operably coupled to the first and second drive wheels respectively to facilitate turning of the riding lawn care vehicle based on drive speed control of the first and second drive wheels responsive to positioning of the steering levers. The brake assembly may be operably coupled to the first and second drive wheels to enable brakes to be selectively applied to the first and second drive wheels. The mechanical brake linkage assembly may be operably coupled between the steering lever and the brake assembly via a cable assembly. The steering lever may be operably coupled to provide drive speed control inputs to a corresponding one of the first or second drive wheels via a carrier configured to pivot in a forward or rearward direction when the steering lever is in an inboard position. The steering lever may be operably coupled to an arm that is operably coupled to the carrier to pivot the steering lever in a direction substantially perpendicular to the forward or the rearward direction when the steering lever is moved to an outboard position. The mechanical brake linkage assembly may include a cable tensioner configured to activate the brake assembly relative to the corresponding one of the first or second drive wheels in response to the steering lever being moved outwardly to the outboard position. The mechanical linkage assembly may be configured to provide a greater amount of rotation of the cable tensioner than a magnitude of rotation of the steering lever when the steering lever is moved from the inboard position to the outboard position.

The riding lawn care vehicle (or mechanical brake linkage assembly) of some embodiments may include additional features that may be optionally added either alone or in combination with each other. The features listed below should therefore be understood to have potential for cumulative addition, or may be added in isolation. When added cumulatively, any combination of the below listed features could be formed. For example, in some embodiments, the cable tensioner may include a first arm and a second arm. Each of the first and second arms may extend away from a pivot point at which the cable tensioner is rotatably mounted to the carrier in respective different directions. An angle between the first and second arms may be greater than 90 degrees, or less than 90 degrees in some alternative designs. In some cases, the cable tensioner may include a bellcrank having the first arm longer than the second arm. In an example embodiment, a length of the second arm may be between about 0.33 and 0.66 times a length of the first arm, and the angle between the first and second arms may be between about 110 degrees and about 150 degrees. In some cases, a distal end of the first arm may be operably coupled to the cable assembly, and a distal end of the second arm may be operably coupled to a link member that extends between the arm and the cable tensioner. In such a case, responsive to movement of the steering lever to the outboard position, the arm may pivot relative to the carrier such that less than 90 degree rotation of the steering lever causes more than 90 degrees of rotation of the cable tensioner. In an example embodiment, the steering lever may rotate between about 20 degrees and 60 degrees, and the cable tensioner may rotate between about 90 degrees and 150 degrees. In some cases, the arm may include a pivot plate having a distal end pivotally coupled to a distal end of the carrier. The link member may be operably coupled to the pivot plate at a portion of the pivot plate that is spaced apart from the distal end of the pivot plate. Rotation of the arm to the outboard position may cause a force to be exerted on the cable tensioner to rotate the cable tensioner and may cause less linear movement of a distal end of the second arm of the cable tensioner than an amount of linear movement at a distal end of the first arm. In an example embodiment, the cable assembly may include a sheath inside which a cable passes from the brake assembly to the first arm. The cable may be under tension biased toward the brake assembly. Moreover, in an example embodiment, the cable tensioner rotates through a breakover point responsive to moving the steering lever between the inboard position and the outboard position such that the steering lever is biased to be retained in each of the inboard position and the outboard position. In some cases, the cable assembly may further include an anchor assembly configured to have a fixed connection to the sheath and a pivotal connection to the carrier. In an example embodiment, the anchor assembly may be configured to pivot as the second arm carries the cable responsive to movement of the steering lever to the outboard position. In an example embodiment, the riding lawn care vehicle is a zero turn mower.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits, or solutions to problems are described herein, it should be appreciated that such advantages, benefits, and/or solutions may be applicable to some example embodiments, but not necessarily all example embodiments. Thus, any advantages, benefits, or solutions described herein should not be thought of as being critical, required, or essential to all embodiments or to that which is claimed herein. Although specific terms are employed herein, they are used in a generic and descriptive sense only and not for purposes of limitation.

That which is claimed:

1. A riding lawn care vehicle comprising:
a frame to which at least a first drive wheel and a second drive wheel of the riding lawn care vehicle are attachable;
a steering assembly comprising a steering lever, the steering lever being one of a pair of steering levers, wherein each of the steering levers is operably coupled to the first and second drive wheels respectively to facilitate turning of the riding lawn care vehicle based on drive speed control of the first and second drive wheels responsive to positioning of the steering levers;
a brake assembly operably coupled to the first and second drive wheels to enable brakes to be selectively applied to the first and second drive wheels; and
a mechanical brake linkage assembly operably coupled between the steering lever and the brake assembly via a cable assembly,
wherein the steering lever is operably coupled to provide drive speed control inputs to a corresponding one of the first or second drive wheels via a carrier configured to pivot in a forward or rearward direction when the steering lever is in an inboard position,
wherein the steering lever is operably coupled to an arm that is operably coupled to the carrier to pivot the steering lever in a direction substantially perpendicular to the forward or the rearward direction when the steering lever is moved to an outboard position,
wherein the mechanical brake linkage assembly comprises a cable tensioner configured to activate the brake assembly relative to the corresponding one of the first or second drive wheels in response to the steering lever being moved outwardly to the outboard position,
wherein the mechanical linkage assembly is configured to provide a greater amount of rotation of the cable tensioner than a magnitude of rotation of the steering lever when the steering lever is moved from the inboard position to the outboard position, and
wherein the cable tensioner rotates through a breakover point responsive to moving the steering lever between the inboard position such that the steering lever is biased to be retained in each of the inboard position and the outboard position.

2. The riding lawn care vehicle of claim 1, wherein the cable tensioner comprises a first arm and a second arm,
wherein each of the first and second arms extends away from a pivot point at which the cable tensioner is rotatably mounted to the carrier in respective different directions.

3. The riding lawn care vehicle of claim 2, wherein the cable tensioner comprises a bellcrank having the first arm longer than the second arm.

4. The riding lawn care vehicle of claim 3, wherein a length of the second arm is between about 0.33 and 0.66 times a length of the first arm,
and wherein the angle between the first and second arms is between about 110 degrees and about 150 degrees.

5. The riding lawn care vehicle of claim 4, wherein a distal end of the first arm is operably coupled to the cable assembly, and a distal end of the second arm is operably coupled to a link member that extends between the arm and the cable tensioner, and
wherein responsive to movement of the steering lever to the outboard position, the arm pivots relative to the carrier such that less than 90 degree rotation of the steering lever causes more than 90 degrees of rotation of the cable tensioner.

6. The riding lawn care vehicle of claim 5, wherein the steering lever rotates between about 20 degrees and 60 degrees, and the cable tensioner rotates between about 90 degrees and 150 degrees.

7. The riding lawn care vehicle of claim 5, wherein the arm comprises a pivot plate having a distal end pivotally coupled to a distal end of the carrier,
wherein the link member is operably coupled to the pivot plate at a portion of the pivot plate that is spaced apart from the distal end of the pivot plate, and
wherein rotation of the arm to the outboard position causes a force to be exerted on the cable tensioner to rotate the cable tensioner and causes less linear movement of a distal end of the second arm of the cable tensioner than an amount of linear movement at a distal end of the first arm.

8. The riding lawn care vehicle of claim 2, wherein the cable assembly comprises a sheath inside which a cable passes from the brake assembly to the first arm, and
wherein the cable is under tension biased toward the brake assembly.

9. The riding lawn care vehicle of claim 8, wherein the cable assembly further comprises an anchor assembly configured to have a fixed connection to the sheath and a pivotal connection to the carrier.

10. The riding lawn care vehicle of claim 9, wherein the anchor assembly is configured to pivot as the second arm carries the cable responsive to movement of the steering lever to the outboard position.

11. A mechanical brake linkage assembly of a riding lawn care vehicle, wherein the riding lawn care vehicle further comprises first and second drive wheels, a steering lever, and a brake assembly, wherein the brake assembly is operably coupled to at least one of the first and second drive wheels to enable brakes to be selectively applied to the first and second drive wheels based on a position of the steering lever,
wherein the mechanical brake linkage assembly comprises a cable tensioner configured to activate the brake assembly relative to the at least one of the first and second drive wheels in response to the steering lever being moved outwardly to an outboard position,
wherein the mechanical linkage assembly is configured to provide a greater amount of rotation of the cable tensioner than a magnitude of rotation of the steering lever when the steering lever is moved from the inboard position to the outboard position, and
wherein the cable tensioner rotates through a breakover point responsive to moving the steering lever between the inboard position and the outboard position such that the steering lever is biased to be retained in each of the inboard position and the outboard position.

12. The mechanical brake linkage assembly of claim 11, wherein the cable tensioner comprises a first arm and a second arm, and
wherein each of the first and second arms extends away from a pivot point at which the cable tensioner is rotatably mounted to the carrier in respective different directions.

13. The mechanical brake linkage assembly of claim 12, wherein the cable tensioner comprises a bellcrank having the first arm longer than the second arm.

14. The mechanical brake linkage assembly of claim 13, wherein a length of the second arm is between about 0.33 and 0.66 times a length of the first arm, and wherein the angle between the first and second arms is between about 110 degrees and about 150 degrees.

15. The mechanical brake linkage assembly of claim 14, wherein a distal end of the first arm is operably coupled to the cable assembly, and a distal end of the second arm is operably coupled to a link member that extends between the arm and the cable tensioner, and wherein responsive to movement of the steering lever to the outboard position, the arm pivots relative to the carrier such that less than 90 degree rotation of the steering lever causes more than 90 degrees of rotation of the cable tensioner.

16. The mechanical brake linkage assembly of claim 15, wherein the steering lever rotates between about 20 degrees and 60 degrees, and the cable tensioner rotates between about 90 degrees and 150 degrees.

17. The mechanical brake linkage assembly of claim 15, wherein the arm comprises a pivot plate having a distal end pivotally coupled to a distal end of the carrier, wherein the link member is operably coupled to the pivot plate at a portion of the pivot plate that is spaced apart from the distal end of the pivot plate, and wherein rotation of the arm to the outboard position causes a force to be exerted on the cable tensioner to rotate the cable tensioner and causes less linear movement of a distal end of the second arm of the cable tensioner than an amount of linear movement at a distal end of the first arm.

18. The mechanical brake linkage assembly of claim 12, wherein the cable assembly comprises a sheath inside which a cable passes from the brake assembly to the first arm, and wherein the cable is under tension biased toward the brake assembly.

19. The mechanical brake linkage assembly of claim 18, wherein the cable assembly further comprises an anchor assembly configured to have a fixed connection to the sheath and a pivotal connection to the carrier, and wherein the anchor assembly is configured to pivot as the second arm carries the cable responsive to movement of the steering lever to the outboard position.

\* \* \* \* \*

UNITED STATES PATENT AND TRADEMARK OFFICE
CERTIFICATE OF CORRECTION

| | |
|---|---|
| PATENT NO. | : 11,485,335 B2 |
| APPLICATION NO. | : 17/600497 |
| DATED | : November 1, 2022 |
| INVENTOR(S) | : Bagwell et al. |

It is certified that error appears in the above-identified patent and that said Letters Patent is hereby corrected as shown below:

In the Claims

In Column 11, Claim 1, Line 46, "the inboard position such" should read --the inboard position and the outboard position such--

Signed and Sealed this
Fourteenth Day of February, 2023

Katherine Kelly Vidal
*Director of the United States Patent and Trademark Office*